US010247576B2

(12) United States Patent
Heide et al.

(10) Patent No.: US 10,247,576 B2
(45) Date of Patent: Apr. 2, 2019

(54) METHOD AND SYSTEM FOR VERIFYING MEASURED DATA

(71) Applicant: Conti Temic microelectronic GmbH, Nürnberg (DE)

(72) Inventors: Dirk Heide, Freinsheim (DE); Nico Steinhardt, Frankfurt am Main (DE)

(73) Assignee: ContinentalTevesAG & Co. oHG, Frankfurt (DE)

( * ) Notice: Subject to any disclaimer, the term of this patent is extended or adjusted under 35 U.S.C. 154(b) by 148 days.

(21) Appl. No.: 15/374,055

(22) Filed: Dec. 9, 2016

(65) Prior Publication Data
US 2017/0089723 A1 Mar. 30, 2017

Related U.S. Application Data

(63) Continuation of application No. PCT/EP2015/062690, filed on Jun. 8, 2015.

(30) Foreign Application Priority Data

Jun. 11, 2014 (DE) .................. 10 2014 211 168

(51) Int. Cl.
*G01C 21/28* (2006.01)
*G01D 3/08* (2006.01)
(Continued)

(52) U.S. Cl.
CPC ............. *G01D 3/08* (2013.01); *G01C 21/165* (2013.01); *G01D 1/16* (2013.01); *G01D 5/24461* (2013.01); *G01C 21/28* (2013.01)

(58) Field of Classification Search
CPC ...................................................... G01C 21/28
See application file for complete search history.

(56) References Cited

U.S. PATENT DOCUMENTS 7,031,031 B1    4/2006 Strasser
10,041,808 B2 *  8/2018 Guillet ................. G01C 21/165

FOREIGN PATENT DOCUMENTS

DE      10243265 A1    3/2004
DE   102005046456 A1    3/2007
(Continued)

OTHER PUBLICATIONS

International Search Report and the Written Opinion of the International Searching Authority for corresponding application PCT/EP2015/062690 dated Oct. 16, 2015.
(Continued)

*Primary Examiner* — David A Rogers

(57) ABSTRACT

The disclosure relates to a method for verifying measured data from at least one sensor system. The measured data directly or indirectly describe values of physical quantities The values of indirectly described physical quantities are calculated from the measured data and/or from known physical and/or mathematical relationships. At least three values describing an identical quantity are subjected in pairs to a mutual comparison. In addition, at least two of the at least three values describing an identical quantity are determined independently of one another by at least one sensor system. A third value describing an identical quantity is determined by a basic sensor system. The disclosure further relates to a corresponding system and a use of the system.

10 Claims, 2 Drawing Sheets

(51) Int. Cl.
  *G01D 5/244*  (2006.01)
  *G01D 1/16*   (2006.01)
  *G01C 21/16*  (2006.01)

(56) References Cited

FOREIGN PATENT DOCUMENTS

| | | |
|---|---|---|
| DE | 102010063984 A1 | 8/2011 |
| DE | 102012216211 A1 | 3/2013 |
| DE | 102012216215 A1 | 3/2013 |
| DE | 102012219478 A1 | 4/2013 |
| EP | 0342375 A1 | 11/1989 |
| WO | 2012025777 A1 | 3/2012 |

OTHER PUBLICATIONS

German Search Report dated Jan. 30, 2015 for corresponding German Patent Application No. 10 2014 211 168.4.

* cited by examiner

METHOD AND SYSTEM FOR VERIFYING MEASURED DATA

CROSS REFERENCE TO RELATED APPLICATIONS

This U.S. patent application claims the benefit of PCT patent application No. PCT/EP2015/062690, filed Jun. 8, 2015, which claims the benefit of German patent application No. 10 2014 211 168.4, filed Jun. 11, 2014, both of which are hereby incorporated by reference.

TECHNICAL FIELD

The disclosure relates to a method and system for verifying measured data from at least one sensor.

BACKGROUND

All measured data are fundamentally prone to errors and in many cases the measured data are not consistently available. In addition, the measured data often depend on environmental conditions. Different sensors or sensor systems generally also have different acquisition rates over time, are not synchronized with other sensors or sensor systems and have a latency between the measurement and the output of the measured values. Sensor errors or measurement errors may be broken down into quasi-stationary parts that are constant over multiple measurements, such as, for example, what is referred to as an offset, and statistical parts with a randomness from measurement to measurement, such as noise. While random parts are fundamentally not deterministically correctable, quasi-stationary errors can generally be corrected with a given observability. Uncorrectable significant errors can usually at least be avoided with a given observability.

In this context, sensor fusion methods are already known in the state of the art, which are normally also suitable for correcting or filtering measured data from different sensors or sensor systems. In the automobile industry, in particular, special requirements must also be considered, since a plurality of different sensors capture a common environmental situation or a motor vehicle condition using different measurement principles and describe this environmental situation or this motor vehicle condition by means of a plurality of different measured data. For a sensor fusion that can be used in the automobile industry, therefore, the greatest possible robustness against random faults and detection and compensation of systematic errors is required. The effects of time on the measured data must similarly be corrected and temporary outages or unavailability of sensors bridged.

DE 10 2010 063 984 A1 discloses a sensor system that includes a number of sensor elements. The sensor elements are designed so that they capture, at least to some extent, differing primary measured values and at least to some extent use different measuring principles. From the primary measured values of the sensor elements, at least to some extent, further measured values are then derived. The sensor system also includes a signal processing device, an interface device, and a number of functional devices. Here the sensor elements and all functional devices are connected to the signal processing device. The primary measured values thus provide redundant data which are compared with one another in the signal processing device or are mutually supportive. From the comparison of the observables calculated by a different route, conclusions can be drawn on the reliability and accuracy of the observables. The signal processing device qualifies the accuracy of the observables and provides the observables, together with an indication of their accuracy, via an interface device to various functional devices.

DE 10 2012 216 211 A1 describes a method for selecting a satellite, where the satellite is a satellite of a global navigation system. Before such a satellite is used for determining the position of a vehicle for example, the GNSS signals received are checked for plausibility in various ways. For this verification, different redundancies or known relations are used. Thus, DE 10 2012 216 211 A1, for instance, discloses how to determine, from the signal of a satellite, both the distance of the vehicle to the satellite and also the speed of the vehicle relative to the satellite. Here the distance can be determined by means of the signal traveling time, while the relative speed can be determined by means of a phase measurement of the signal. Since the distance and the relative speed are interdependent, they can be verified against one another. A verification of the values determined from the signal can also be performed against known boundary conditions, since a vehicle usually moves along within a certain speed range. A description is similarly given of how upon receipt of a plurality of signals from various satellites the distances to a number of satellites can be determined and these distances simultaneously verified through trigonometric relationships and the known distance of the satellites from one another. Finally, verification of the distance determined from the signal or the speed determined from the signal by means of other sensors, which similarly allow the determination of a position or the determination of a speed is also possible. Where the signals of a satellite cannot be verified, this satellite is not used for determining the position or for determining the speed.

The generic method and sensor systems known from the state of the art are, however, afflicted with disadvantages in this regard, such that they do not make optimum use of the available redundancies for error detection or mutual verification of the measured values.

SUMMARY

As such, it is desirable to have a method and system that provides an improved method and system for verifying measured data, for example, data received from at least one sensor or sensor systems. The measured data directly or indirectly describes values of physical quantities. The values of indirectly described physical quantities are calculated from the measured data and/or from known physical and/or mathematical relationships. At least three values describing an identical quantity are subjected in pairs to a mutual comparison. At least two of the at least three values describing an identical quantity may be determined independently of one another by at least one sensor system. In addition, a third value describing an identical quantity may be determined by a basic sensor system.

This results in the advantage that to the greatest possible extent, optimum use may be made of the available redundancies, since both parallel redundancies (i.e., the values detected by the sensor system and by the base sensor system describing identical quantities) and analytical redundancies (i.e., the values from the sensor system independent of one another describing identical quantities) are used.

A further advantage of the method according to the disclosure is the maximum independence from a fusion algorithm often used in the state of the art, where the sensitivity of the detection or verification is no longer influenced by its stochastic model of the noise taken into consideration by the model and the measurement errors taken into consideration by the model. The sensitivity of the method according to the disclosure thus has the maximum independence from the system noise of what is referred to as a fusion filter. Hence, the method according to the disclosure is relatively more robust, particularly in scenarios with high disturbance.

In some implementations, in each paired comparison, leading to a nonconformity, a quality counter associated with the values involved in the comparison is increased by a specified set value and values are verified where their quality counter does not exceed a quality threshold. This results in the advantage that based on the set value of the quality counter at the end of the method the quality of the corresponding measured data or the quality of the values of the measured data may be determined relatively accurately. Depending on the exceeding of the quality threshold the corresponding measured data or the values of the measured data may then be verified. An erroneous value may thus be identified easily by means of its quality counter. This also allows a clear differentiation of an erroneous value from a correct value or a clear identification of the erroneous value as such at the end of the comparison. If the quality counter exceeds a value of the quality threshold at the end of the comparison, then the corresponding value is identified as erroneous. This means, by way of example, that the corresponding value is not further processed or is rejected and deleted.

The specified set value, by which the quality counter of the values involved in the comparison is increased for nonconformity, can for example be "1". However, it may also be possible for the value of the set value to be specified as a function of a degree of the nonconformity. For example, for just a minor deviation or nonconformity the specified set value can be "0.1", whereas for a major deviation or nonconformity the specified set value can be "2". The latter also favors the simultaneous identification of two values compared in a pair, which are both erroneous.

In some examples, the method is carried out for verification with three values, then three paired comparisons are performed. Since the three values describe an identical physical quantity, for instance a speed, they must correspond for all values to be error-free. If, however, one of the values is erroneous, in two out of the three comparisons a nonconformity is identified, namely in each of the two comparisons in which the erroneous value is involved. If the quality counter of any one of the three values is increased by "1" for a nonconformity, the quality counters of the error-free values ultimately each have the value "1", while the erroneous value has the value "2". If the quality threshold is now "1.5", the error-free values are verified, whereas the erroneous value is rejected.

A general example is provided for verifying measured data based on the quality counter: With n measured data or values and an increase in the quality counter for nonconformity of two values during a paired comparison by the set value "1", the quality threshold according the Gaussian empirical formula is $[(n-1)*n]/2$. This means, therefore, that a value for which the associated quality counter reaches the value n-1, will be rejected. Here the value n can be advantageously made dependent upon the type of sensor system or base sensor system, by way of example for what is referred to as a GPS navigation system, upon the number of detectable GPS satellites.

The method may be used in a motor vehicle for verifying position data or speed data. In some examples, after verification, the measured data are made available to a sensor data fusion process, which generates a fusion data set from various measured data.

It is advantageous for the comparison to be performed by a stochastic model specific to the sensor system, where the stochastic model considers measurement uncertainties specific to the sensor system. This results in the advantage that for the comparison account is also taken of the specific features of the sensor system and in particular the noise of the measured data or the values. This improves the reliability and robustness of the verification according to the disclosure, since nonconformities during the comparison in connection with features or noise specific to the sensor system are tolerated.

It is further advantageous that a quality counter associated with the base sensor system is never increased. This does not mean, for the purposes of the disclosure, however, that the values of the measured data of the base sensor system are precise, merely that within a statistical tolerance range, which for example takes noise influences into account, they correspond to their stochastic model. Thus, it is assumed that the base sensor system, unlike the other sensor systems, is unaffected by external interference and is afflicted merely by white noise. The values of the base sensor system are therefore always verified. As such, in a comparison, during which a nonconformity is identified, it may be always only the quality counter of the values of measured data of the other sensor system that is increased.

In some examples, the inertial navigation system is the base sensor system. The values being compared may have been detected at an identical point in time. This results in the advantage that—at least for error-free measurement—all the values being compared correspond, since they describe the same physical quantity at the same point in time. This simplifies the identification of erroneous values, since the cause of a nonconformity in this case must necessarily be an erroneous value.

In some implementations, the values being compared are generated by interpolation, if no values captured at an identical point in time are available. Since the measured data are captured at different points in time or at least at different points in time of the sensor systems due to different signal output delays and generally due to a lack of synchronization between the sensor systems, the necessary values may be calculated by the interpolation. In this case, measured data or values of the sensor system may be generated with the lowest signal output delay by interpolation, which means that these measured data or values are generated as a function of the times of capture of the data or values of the other sensor system. Advantageously, for the generation of a value by interpolation, the two values of the sensor system closest in time to the value to be generated, and either side of this, are used. The value generated by interpolation is then subjected to the comparison as described. Here, the sensor system with the lowest signal output delay may be the base sensor system.

In some examples, changes to the values for the interpolation are assumed to be proportional to the time. Thus a linear interpolation takes place. This results in the advantage that the interpolation is relatively simple and accordingly may be carried out with minimal computing effort.

In some implementations, in a comparison for nonconformity, it is identified if the values deviate from one another by more than their measurement uncertainties. In this case, the measurement uncertainties are determined by a stochastic model, with which the values must comply. Such a stochastic model can, for example, be a simple Gaussian distribution, where the correspondence or nonconformity are, for example, checked by what is referred to as a Normalized Innovation Squared (NIS) test. Other suitable stochastic models may be used. In some examples, for each sensor system an individual stochastic model is selected, which best complies with the statistical nature of the respective sensor system. This results in the advantage that deviations in the values caused merely by noise or other minor interferences do not lead to identification of a nonconformity, and thus an essentially error-free value is not identified wrongly as erroneous and accordingly not verified.

In some examples, the verified values are fused into a fusion data set. The values verified and fused to form a fusion data set are particularly reliable and accurate. The fusion of the verified values into a fusion data set may take place by what is referred to as an error state space Kalman filter. The error state space Kalman filter includes a fusion filter for fusion of the measured values, in particular for fusion of normally distributed measured values. At the same time the error state space Kalman filter estimates or determines quantitative errors of the values of at least one sensor system. A special feature of the error state space Kalman filter is that instead of the values only quantitative errors of the values are incrementally estimated or determined and then the values are corrected by adjustments. The error values actually have significantly lower temporal dynamics than the measured values themselves, resulting in an extensive decoupling of the dynamics of the error state space Kalman filter from the sensor characteristics being achieved and additional delays or errors by group delays of the individual signal package being reduced.

A further special feature of the error state space Kalman filter is that by applying a correction, the estimated or determined error values following each working cycle of the error state space Kalman filter are zero. As a result, an otherwise normal prediction step for forecasting the quantitative errors in the following working cycle can be dispensed with, as a result of which the calculation effort for the error state space Kalman filter is reduced.

In some examples, the measured data are at least measured data of an inertial navigation system, measured data of a global satellite navigation system and/or measured data of an odometry navigation system. Thus, the present disclosure may be suitable for navigation purposes and for navigation systems, in particular in motor vehicles. The method thus determines, inter alia, the position, the speed and the direction, preferably for a motor vehicle, from the measured data. The global satellite navigation system may by way of example be what is referred to as a GPS navigation system. In some examples, the satellite navigation system includes at least two satellite signal receivers. This improves the quality of the satellite signals captured and thus the reliability and accuracy of the satellite navigation system. The odometry navigation system initially determines the speed, e.g., from the speed of rotation and the known rolling circumference of the motor vehicle tires, and from these, by updating a known position taking into consideration the steering angle, the current position. The inertial navigation system may include three inertial sensors capturing orthogonally to one another for translational movements and for rotational movements in all directions in space, which similarly to the odometry navigation system allow an update of a known position.

In some implementations, for calculating values of indirectly described quantities, orbits of satellites of the satellite navigation system are assumed to be error-free. The orbits of the satellites represent for some of the indirectly described quantities, physical or mathematical relationships necessary for their calculation. This results in the advantage that a possible stochastic model upon which the indirectly described value concerned is based does not have to take into consideration any error influences of the orbits and may have correspondingly tight tolerances for the values in the event of deviations from the stochastic model. The requirements of the values to be checked for plausibility are therefore increased and so the quality of the plausibility checking is improved.

The disclosure further relates to a system for verifying measured data of at least one sensor system, including at least one sensor system, a base sensor system and a verification module. The at least one sensor system and the base sensor system are designed to output direct or indirect values of measured data describing physical quantities. The verification module is designed to calculate the values of indirectly described physical quantities from the measured data and/or from known physical and/or mathematical relationships. The verification module is designed to subject at least three values describing an identical quantity to a paired comparison and at least one sensor system is designed to determine at least two of the at least three values describing an identical quantity independently of one another. The base sensor system is designed to determine a third value describing an identical quantity. Since the system according to the disclosure is thus designed to carry out the method according to the disclosure, and in particular also carries it out, in combination with the said sensor system this leads to the advantages described above. The system according to the disclosure thus includes all devices necessary for carrying out the method according to the disclosure. In some examples, the plausibility checking module can also include a number of submodules. The system may be designed to carry out the method according to the disclosure. The disclosure also relates to a use of the system according to the disclosure in a motor vehicle.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
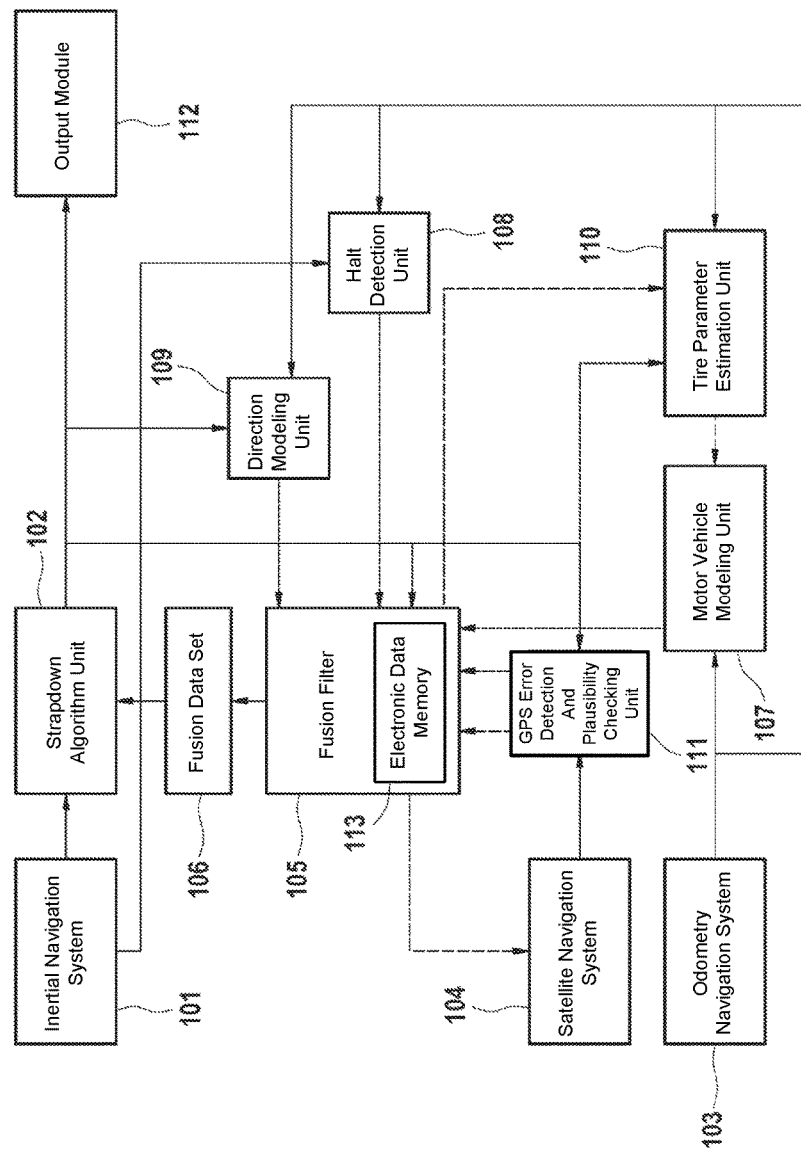
FIG. 1 is a schematic view of an exemplary system in a motor vehicle designed for position determination.

FIG. 1 is a schematic representation of a system for arrangement and use in a motor vehicle (not shown). The system is designed for position determination of the motor vehicle. All elements or components or sensor systems of the system are shown in the figure as functional blocks and the interactions of these are indicated.

The system includes inertial navigation system 101, designed to capture at least the accelerations along a first, a second, and a third axis and at least the yaw rates about the first, about the second, and about the third axis. Here the first axis corresponds, for example, to the longitudinal axis of the motor vehicle, the second axis corresponds to the transversal axis of the motor vehicle and the third axis corresponds to the vertical axis of the motor vehicle. These three axes form a Cartesian system of coordinates, referred to as the motor vehicle coordinate system. Inertial navigation system 101 includes, for example, exclusively the sensor technology necessary for capturing the accelerations and yaw rates. The inertial navigation system 101 does not, for example, include the electronics necessary for processing or evaluating the sensor signals.

Inertial navigation system 101, for example, together with strapdown algorithm unit 102 described in more detail below, forms what is referred to as the base system, the measured values of which are corrected by what are referred to as the correction systems, described below. In this case, the correction systems are odometry navigation system 103 and satellite navigation system 104.

In some examples, the system also features what is referred to as a strapdown algorithm unit 102, in which what is referred to as a strapdown algorithm is executed, by means of which the measured values of inertial sensor navigation system 101 are converted, inter alia, into speed and position data. In some examples, the measured values of inertial sensor navigation system 101, which of course describe accelerations, are integrated once or twice over time. A direction of the motor vehicle is also determined by single integration over time of the corresponding measured values of inertial sensor navigation system 101. By means of single integration over time, the direction and speed of the motor vehicle are also determined. The Strapdown algorithm unit 102 may also compensates for a Coriolis acceleration and gravity acting on inertial navigation system 101, referred to as the earth transport rate the earth rotation rate.

The output data of the strapdown algorithm unit 102 accordingly include the following physical quantities: the speed, the acceleration, and the yaw rate of the motor vehicle, for example in relation to the three axes of the motor vehicle coordinate system and for example also in each case in relation to a world coordinate system, suitable for describing the direction or dynamic quantities of the motor vehicle in the world. The world coordinate system is, for example, a GPS coordinate system. The output data of the strapdown algorithm unit 102 further include the position in relation to the motor vehicle coordinate system and the direction with respect to the world coordinate system. The abovementioned physical quantities calculated by the strapdown algorithm unit 102 are outputed via an output module 112 and made available to other motor vehicle systems.

The system further includes an odometry navigation system 103 in the form of wheel speed sensors for each wheel of the motor vehicle. One example is a four-wheel motor vehicle with four wheel speed sensors, which in each case capture the speed of the associated wheel and its direction of rotation. The odometry navigation system 103 may also include a steering angle sensor element, which captures the steering angle of the motor vehicle.

Moreover, the sensor fusion system shown as an example features satellite navigation system 104, which is designed to determine the distance in each case between an associated satellite and the motor vehicle and the speed in each case between the associated satellite and the motor vehicle. In addition, the satellite navigation system 104, for example, provides fusion filter 105 with a starting position or starting position information, at least upon starting or switching on of the system.

The system further includes a fusion filter 105. The fusion filter 105 provides a fusion data set 106 in the course of the combined assessment of the measured data of the odometry navigation system 103, the satellite navigation systems 104, and the inertial sensor navigation system 101. The fusion data set 106 includes, for example, the error values or the corrections for the various measured data or values captured.

The measured data or values of the inertial sensor navigation system 101 are now stored in an electronic data memory 113 of the fusion filter 105 provided for this purpose for a specified time. Here, the inertial navigation system 101, together with the strapdown algorithm unit 102, represents what is referred to as the base system, while the odometry navigation system 103 and the satellite navigation system 104 represent what are referred to as the correction systems, the values of which are used for correction of the values of the base system, provided they have been checked for plausibility. The measured data or values of the base system, thus the measured data or values of the inertial navigation system 101, are for example stored for 25 measuring epochs. If necessary, that is to say if the point in time when the stored measured data or values were captured differs from that of the measured data or values of the correction systems, the necessary measured data or values are interpolated from the stored measured data or values. The measured data or values of the correction systems, thus of the satellite navigation system 104 and of the odometry navigation system 103, are not stored however. This ensures that values that are at least apparently captured at the same point in time can always undergo the comparison.

The fusion data set 106 provided by the fusion filter 105 includes, for example, the quantitative errors of the base system determined by the verified values of the correction system. The Strapdown algorithm unit 102 may now correct the measured values of the base system by the fusion data set 106.

In some implementations, the fusion data set 106 is calculated by the fusion filter 105 from the measured data or values of the odometry navigation system 103, the satellite navigation system 104, and the inertial navigation system 101.

The fusion filter 105, for example, is designed as an error state space Kalman filter, thus as a Kalman filter, which in particular carries out a linearization of the values and in which the quantitative error values of the values are calculated or estimated and which works sequentially and in doing so corrects the measured data or values available in the respective function step of the sequence.

The fusion filter 105 is designed so that it asynchronously captures the most up-to-date measured values available from the inertial navigation system 101, the odometry navigation system 103 and the satellite navigation system 104. For example, here the measured values are passed through the motor vehicle modeling unit 107 and the direction modeling unit 109.

The motor vehicle modeling unit 107 is designed to calculate at least the speed along a first axis, the speed along a second axis, and the yaw rate about a third axis from the measured data of the odometry navigation system 103, and provides these to the fusion filter 105.

The system further includes a tire parameter estimation unit 110, which is designed to calculate at least the radius, for example the dynamic radius, of all wheels and also calculate the skew stiffness and the slip stiffness of all wheels and provide these to motor vehicle modeling unit 107 as additional input variables. Tire parameter estimation unit 110 is also designed to use a substantially linear tire model for calculation of the tire sizes.

Examples of the input variables of the tire parameter estimation unit 110 are the measured data describing the wheel speeds and the steering angle, at least to some extent the output values of the strapdown algorithm unit 102, and the variances determined by fusion filter 105.

The system further includes a GPS error detection and plausibility checking unit 111, which is designed to receive, as input data, the measured data or values of satellite navigation system 104 and at least to some extent measured data or values from strapdown algorithm unit 102 and takes these into consideration in its calculations. The GPS error detection and plausibility checking unit 111 checks the measured data or values against a stochastic model adapted for the satellite navigation system 104. Where the measured data or values are consistent with the model in terms of a tolerance that takes account of the noise, they are verified or confirmed.

The GPS error detection and plausibility checking unit 111 may also be connected with the fusion filter 105 at the data level and passes plausibility-checked measured data or values to the fusion filter 105.

The GPS error detection and plausibility checking unit 111 is, for example, designed so that it carries out a method for selecting a satellite. The method includes measuring position data of the motor vehicle in relation to the satellite based on the sensor signals of the satellite navigation system 104. The method also includes determining redundant reference position data of the motor vehicle for the position data determined on the basis of the sensor signals of the satellite navigation systems 104. The method includes selecting the satellite, if a comparison of the position data and the reference position data satisfies a predefined condition. For comparing the position data and the reference position data a difference between the position data and the reference position data is formed. The predefined condition is a maximum permitted deviation of the position data from the reference position data. The maximum permitted deviation is dependent upon a standard deviation calculated based on a sum of a reference variance for the reference position data and a measurement variance for the position data. The maximum permitted deviation corresponds to a multiple of the standard deviation so that a probability that the position data fall in a spread interval dependent upon the standard deviation, is below a predefined threshold value.

The system may further include a halt detection unit 108, designed to detect a halting of the motor vehicle and in the event of detecting a halt of the motor vehicle provides at least the fusion filter 105 with information from a halt model. The information from the halt model may describe how the yaw rates about all three axes have a value of zero and the speeds along all three axes have a value of zero. In some examples, the halt detection unit 108 is designed to use, as input data, the sensor signals of the wheel speed sensors of the odometry navigation system 103 and the sensor signals of inertial navigation system 101.

In some implementations, the system uses a first group of measured data or values, relating to a motor vehicle coordinate system and also a second group of measured data or values, relating to a world coordinate system. The world coordinate system is used for describing the direction and dynamic quantities of the motor vehicle. The direction modeling unit 109 may determine a direction angle between the motor vehicle coordinate system and the world coordinate system.

The direction angle determined by the direction modeling unit 109 between the vehicle coordinate system and the world coordinate system may be determined here on the basis of the following physical quantities: the vectorial speed with reference to the world coordinate system, the vectorial speed with reference to the motor vehicle coordinate system, the steering angle, and the respective quantitative errors of the measured data or values describing said quantities. The direction modeling unit 109 refers to all the output data of strapdown algorithm unit 102.

In some examples, the direction modeling unit 109 is designed so that, in addition to the direction angle, it calculates further information on the data quality of the direction angle in the form of a variance and provides this to fusion filter 105.

The fusion filter 105 uses the direction angle and the variance of the direction angle in its calculations, which it forwards via the fusion data set 106 to the strapdown algorithm unit 102. Thus, the fusion filter 105 captures the measured data of the inertial navigation system 101, the base system, and the odometry navigation system 103, and from the satellite navigation system 104 constituting the correction systems. The plausibility checking module is, for example, independent of the fusion filter 105. The Fusion filter 105 therefore carries out paired comparisons of the values of three in each case identical physical quantities. The physical quantities concern, for example, the position and the speed of the motor vehicle, which, as described, in each case are directly or indirectly contained in the measured data of the inertial navigation system 101, the odometry navigation system 103, and of the satellite navigation system 104. In some examples, the paired comparisons take place in what is referred to as raw data form, that is to say that it is the raw data of the respective sensor systems that are compared. Where the raw data describe a value to be compared only indirectly, then this circumstance is taken into consideration via a corresponding stochastic model. Each time that there is a nonconformity during the comparison a quality counter associated with the respective value is increased by the set value of "1". For example, the values being compared originate from a point in time, when the left front wheel was experiencing excessive wheel slip. The values of the measured data of the odometry navigation system 103 thus have a quantitative error with respect to the left front wheel. In the comparison with the corresponding values of inertial navigation system 101 and with the speeds determined by the odometry navigation system 103 of the other three vehicle wheels, a nonconformity is identified in each case and the quality counter of the corresponding values is in each case increased by the set value of "1". Accordingly, the quality counter of the value for the speed of the left front wheel of the odometry navigation system 103 ultimately has a quality value of "3", whereas the quality counters of the values for the speeds of the remaining three vehicle wheels of the odometry navigation system 103 in each case have a value of "1", and the quality counter for the speed of the vehicle as a whole of the inertial navigation system 101 similarly has a quality value of "1".

Since, for example, the verification threshold value is "2", the values for the speed for the vehicle as a whole are verified by the inertial navigation system 101 and for the speed for the remaining three vehicle wheels by the satellite navigation system 104 and used by the fusion filter 105 for creating the fusion data set 106. The values for the left front wheel of the odometry navigation system 103, however, are not verified and are rejected.

Figure 2:
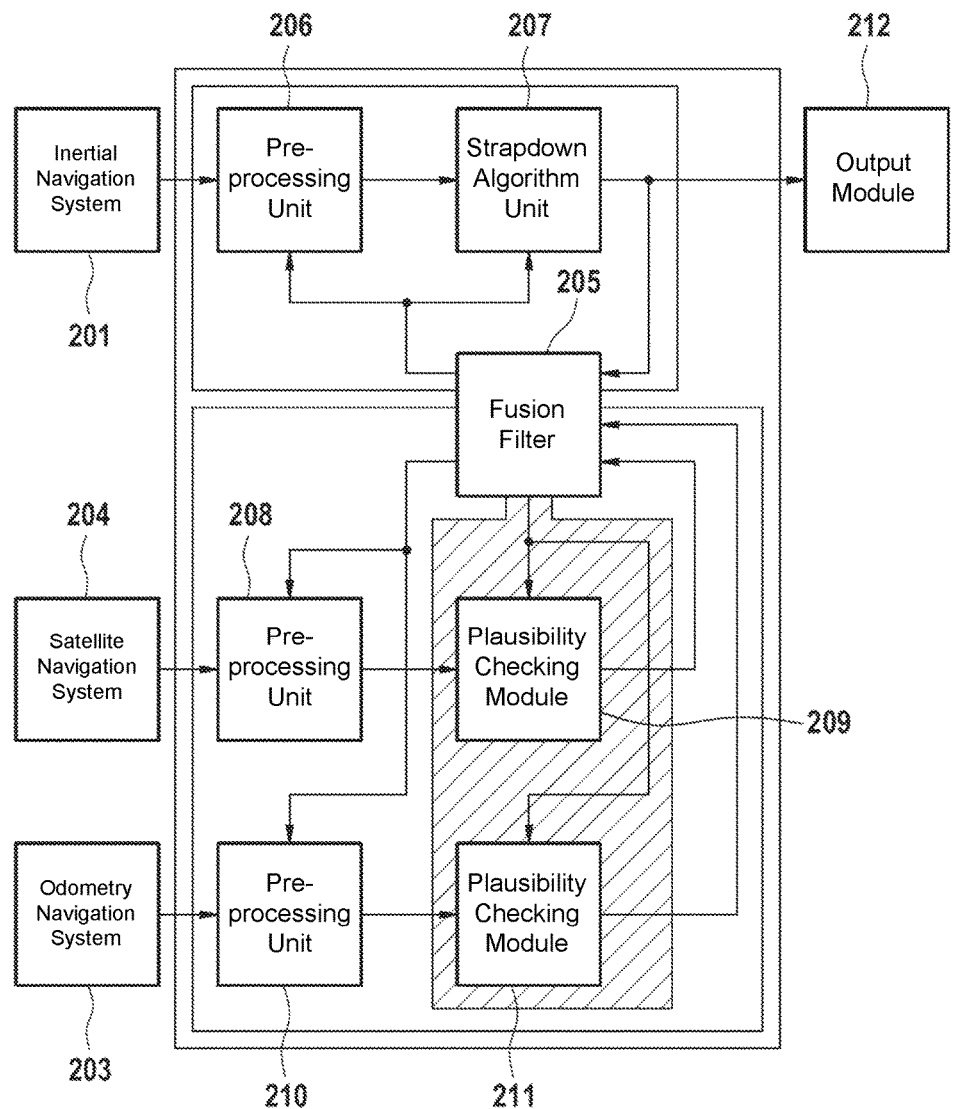
FIG. 2 is a schematic view of an exemplary system in a motor vehicle designed for position determination.

FIG. 2 shows, by way of example, an exemplary system according to the disclosure, which is similarly designed for position determination, in a motor vehicle (not shown). The system includes for example an inertial navigation system 201, a satellite navigation system 204, and an odometry navigation system 203 as different sensor systems. The inertial navigation system 201, the satellite navigation system 204, and the odometry navigation system 203 output measured values, which directly or indirectly describe physical quantities, namely values of a position, a speed, an acceleration, a direction, a yaw rate or a yaw acceleration, in the form of pre-processed raw data to a fusion filter 205. Here the output of the measured values takes place via a vehicle data bus, for example via what is referred to as a CAN bus. For example, the satellite navigation system 204 outputs its measured data in the form of raw data.

As a central element in a position determination of the motor vehicle, the inertial navigation system 201, which involves what is referred to as a MEMS-IMU (Microelectromechanical Systems Measurement Unit), is used in combination with a strapdown algorithm unit 207, since this is assumed to be error-free, i.e., it is assumed that the values of the inertial navigation system 201 always correspond to their stochastic model, they are afflicted only by noise and are thus free from external or random errors. Here the noise and remaining, unmodeled errors of the inertial navigation system 201, such as for example nonlinearity, are assumed to be zero-mean, stationary and normally distributed across the measurement range (referred to as Gaussian white noise).

In some example, the inertial navigation system 201 includes three yaw rate sensors capturing orthogonally to one another and three acceleration sensors capturing orthogonally to one another. The satellite navigation system 204 includes a GPS receiver which during the satellite signal travelling time initially performs measurements of the distances to the receivable GPS satellites and further from the change in satellite signal travelling time and also the change in the number of wavelengths of the satellite signals determines a path traveled by the motor vehicle. In some examples, the odometry navigation system 203 includes a wheel speed sensor on each wheel of the motor vehicle and a steering angle sensor. The wheel speed sensors each determine the wheel speed of the associated wheel and the steering angle sensor determines the steering angle covered.

In some implementations, the inertial navigation system 201 outputs its measured data or values to a pre-processing unit 206 from the inertial sensor navigation system 201. The pre-processing unit 206 now corrects the measured data or values using correction values, which the pre-processing unit 206 receives from the fusion filter 205. The measured values corrected in this way or the physical quantities described therein are now forwarded to the strapdown algorithm unit 207. Since, for example, the pre-processing unit 206, the strapdown algorithm unit 207, and the fusion filter 205 involve software modules, which are executed in different partitions of one and the same processor, the corrected measured values or sensor signals can be forwarded relatively easily and quickly.

In some examples, the strapdown algorithm unit 207 uses the corrected measured data or values from the pre-processing unit 206 to now perform a position determination. Here, this position determination is what is referred to as dead-reckoning on the basis of the inertial navigation system 201. To this end the corrected measured data or values output by the pre-processing unit 206 are continuously integrated or summed up over time. The strapdown algorithm unit 207 may also compensates for a Coriolis acceleration and gravity acting on inertial navigation system 201, referred to as the earth transport rate and the earth rotation rate, which can each affect the measured data of the inertial navigation system 201. The system also has what is referred to as a strapdown algorithm unit 207, in which what is referred to as a strapdown algorithm is executed, by means of which the measured values of inertial sensor navigation system 201 are converted, inter alia, into speed data and position data. To this end the sensor signals of the inertial sensor navigation system 201, which naturally describe accelerations and yaw rates, are integrated once or twice over time. A direction of the motor vehicle is also determined by single integration of the corresponding sensor signals of the inertial sensor navigation system 101 over time. This allows an update of a previously known position and an update of a previously known direction of the motor vehicle.

In some implementations, the strapdown algorithm unit 207 also corrects the determined position, the determined speed, and the determined direction by means of corresponding correction values of fusion filter 205. In this example, fusion filter 205 thus performs the correction only indirectly via strapdown algorithm unit 207. The values or physical quantities, determined and corrected by the strapdown algorithm unit 207, thus the position, the speed, the acceleration, the direction, the yaw rate and the rotational acceleration of the motor vehicle are now performed on an output module 212 and on the fusion filter 205.

In some examples, what is referred to as the strapdown algorithm executed by the strapdown algorithm unit 207 is not particularly complicated and can thus be implemented as a real-time capable base system. It represents a process sequence for integration of the measured values of the inertial navigation system 201 for speed, direction and position and contains no filtering, resulting in an approximately constant latency and group delay.

In some examples, the term base system describes the sensor system, the measured data or values of which are corrected by the measured data or values of the other sensor systems, referred to as correction systems. These correction systems concern, for example, the odometry navigation system 203 and the satellite navigation system 204.

The inertial navigation system 201, the pre-processing unit 206 of the inertial sensor navigation system 201 and the strapdown algorithm unit 207, for example, together form what is referred to as the base system, which also partly includes the fusion filter 205.

The output module 212 forwards the physical quantities, determined and corrected by the strapdown algorithm unit 207, to optional further systems of the motor vehicle.

The measured values captured by the satellite navigation system 204 are, for example, initially forwarded to the pre-processing unit 208 of the satellite navigation system 204. The pre-processing unit 208 may correct the measured data, which are what is referred to as raw data, by means of error values or corrections received by the fusion filter 205, from the satellite navigation system 204 and also calculates the trajectory data of the GPS satellites from which GPS signals are received. In some examples, the satellite navigation system 204 further determines a speed of the motor vehicle relative to the GPS satellites, from which GPS signals are received. The pre-processing unit 208 may also correct a time error of a receiver clock of the satellite navigation system 204 contained in the measured values, resulting from drift by the receiver clock, and by means of a correction model the changes in signal traveling time and signal path caused by atmospheric effects in the GPS signals transmitted by the GPS satellites. Correction of the time error and the atmospheric effects also takes place by means of correction values received from the fusion filter 205.

In some implementations, the satellite navigation system 204 is also associated with the plausibility checking module 209, which checks the measured values of the physical quantities output by the pre-processing unit 208, thus values of the GPS raw data describing the position and the speed of the motor vehicle, for plausibility. The measured data or values checked for plausibility by the plausibility checking module 209 are then output to the fusion filter 205. For the plausibility check, the concept according to the disclosure for plausibility checking or verification is referred to. This concept provides for the use of further existing redundancies for plausibility checking of values captured or determined by the satellite navigation system 204. The respective measured data or values are initially compared with an associated sensor-specific model, which takes into consideration measurement uncertainties such as the effects of noise. To this end the GPS raw data of all receivable GPS satellites are compared with each other. For example, the vehicle receives five GPS satellites. If the measured data or values correspond to the model within the stated limits or tolerance ranges, a first verification takes place here and the values verified in this way are further processed. Then the measured data or values determined by the inertial navigation system 201 are used to check for plausibility of the values of the satellite navigation system 204. If it is not possible to verify or plausibility check these measured data, the corresponding measured data are rejected and not processed further. In some example, the plausibility checking takes place via a paired comparison of the values to be plausibility checked, that is to say the position and speed determined by the satellite navigation system 204, with the positions and speeds determined by the inertial navigation system 201. If a paired comparison identifies a nonconformity, then a quality counter associated with the respective value is increased by "1". If the quality counter does not exceed a value of "2", then the respective associated value is ultimately plausibility checked. These paired comparisons are performed both for the position determined by the satellite navigation system 204 and for the speed determined by the satellite navigation system 204. The positions and speeds determined by the inertial navigation system 201 and necessary for the paired comparisons are forwarded here to the plausibility checking module 209 from the fusion filter 205. The measured data or values verified by the plausibility checking module 209 are then outputted to the fusion filter 205.

In some implementations, the system also includes pre-processing unit 210 of the odometry navigation system 203, which receives via the CAN bus the measured data or values captured by the odometry navigation system 203. The captured measured data or values are, in this case, the measured data or values of the individual wheel speed sensors and the measured data or values of the steering angle sensor. The pre-processing unit 210 may determine from the measured data or values outputted by the odometry navigation system 203 according to what is referred to as a dead-reckoning method, the position and direction of the motor vehicle in the motor vehicle coordinate system. The pre-processing unit 210 may further correct the measured data or values received from the odometry navigation system 203 by using correction values received from the fusion filter 205.

In some examples, the odometry navigation system 203 is also associated with the plausibility checking module 211, which checks the measured data or values outputted by the pre-processing unit 210, for example in raw data form, thus the position, the direction, the speed, the acceleration, the yaw rate and the rotational acceleration of the motor vehicle for plausibility. Since the faults in the measured data or values of the odometry navigation system 203 are frequently random faults caused by environmental factors unrelated to white noise, for example, with comparatively high wheel-slip of at least one of the vehicle wheels, the concept according to the disclosure for verification or plausibility checking may be applied, namely the use of as many redundancies as possible. Therefore, the measured data or values determined by the inertial navigation system 201 are used to check the measured data or values of the odometry navigation system 203 for plausibility. In some examples, however, the measured data or values are initially compared in the context of an associated sensor-specific model, which takes into consideration measurement uncertainties such as the effects of noise. For example, sensor raw data from the wheel speed sensors associated with the four vehicle wheels are compared with each other via the model. Where the measured data or values correspond to the model within the stated limits or tolerance ranges, a further comparison is performed with the corresponding measured data or values of inertial navigation system 201. In some examples, Where in a paired comparison, a nonconformity is identified, a quality counter associated with one of the values involved in the comparison is increased by a value of "1". Finally, all values are verified where their quality counter does not exceed the quality threshold of, for example, a "2". The verified values are then forwarded to the fusion filter 205. Where no verification of these measured values is possible, the corresponding measured values are rejected and not further processed.

In some examples, the individual plausibility checking module 209 and plausibility checking module 211, with the partial involvement of the fusion filter 205 form an independent plausibility checking module within the meaning of the disclosure.

In some implementations, the fusion filter 205 is designed as an error state space Kalman filter. The main task of the fusion filter 205 is, for example, to correct the measured data or values of the base system, thus of the inertial navigation system 201, by using measured data or values from the odometry navigation system 203 and the satellite navigation system 204, which constitute the correction systems, or to output corresponding correction values to the strapdown algorithm unit 207. The fusion filter 205, based on the measured values of odometry navigation system 203, may determine the individual wheel speeds of the motor vehicle in the vehicle coordinate system. Furthermore, the fusion filter 205, based on the measured values of satellite navigation system 204, may determine the position and the speed in the GPS coordinate system, where the GPS coordinate system is what is referred to as a world coordinate system.

Since the inertial navigation system 201, which may be the base system, is assumed to be free from random errors and external faults, the measured data or values of the inertial navigation system 201 are subjected exclusively to white noise. Because of the differing signal output delays of the inertial navigation system 201, the odometry navigation system 203 and the satellite navigation system 204, the measured data or values of the inertial navigation system 201 are stored over a period of 25 measuring epochs in an electronic data memory (not shown). It is thus ensured that both the measured data or values of the odometry navigation system 203 and the satellite navigation system 204 are provided with measured data or values from the inertial navigation system 201 are available for comparison, which were captured at exactly the same time.

Since the fusion filter 205 is what is referred to as an error state space Kalman filter, exclusively the quantitative errors of the values are determined and corresponding corrections are performed. This simplifies and speeds up the fusion, performed by the fusion filter 205, of the values of the inertial navigation system 201, the odometry navigation system 203 and the satellite navigation system 204, into a common fusion data set. This allows real-time capable position determination and correction of the position determination.

The system shown in FIG. 2 represents a virtual sensor, where the inertial navigation system 201, the odometry navigation system 203 and the satellite navigation system 204 are not components of the virtual sensor. A virtual sensor is a system which independently of the nature of the sensor system involved—here the inertial navigation system 201, the odometry navigation system 203 and the satellite navigation system 204—always generates the same output data or outputs. Based on the output data or outputs, it is unclear which sensor systems are involved in the system.

According to another aspect of the disclosure (not shown), an inertial navigation system, including the base system to be corrected, is assumed to be unaffected by external interference, whereas the correction systems, an odometry navigation system and a satellite navigation system, are afflicted by random, environmental interference. As long as the extent and frequency of such interference are consistent with their white noise modeling, then there will be no restriction, for example, when correcting the base system, to the fusion of the values to form a fusion data set. However, since this is generally not the case for the correction systems used, for example, when there is multipath scattering with GPS or major slippage of an individual wheel, the method according to the disclosure is used.

Due to the requirement of the plausibility checking method to maximize the probability of detection and the speed of detection of quantitative errors in the values, for example, the largest possible number of available redundancies are used for the method according to the disclosure.

Since the quality of the corrections of the fusion filter benefits from all measured data or values corresponding to their stochastic model, the method may be carried out only for deviations of measured data or values from their stochastic model and otherwise the fusion filter supplies the greatest possible number of measurements unchanged.

In the following, by way of example, the comparison of values of a satellite navigation system with their sensor-specific stochastic model is described. The measured data of the satellite navigation systems are, for example, referred to as GPS code measurements. The values to be plausibility checked for the code measurements are the differences between geometrically calculated and measured pseudoranges $\Delta\rho$ (also known as reduced observation). The pseudoranges $\Delta\rho$ describe the difference between the distances between receiver antenna and satellite determined in the following ways:

1. geometrically, from the current position and satellite position,
2. travel-time measurement (pseudorange).

Therefore, the maximum standard deviation $\sigma_{PSR,Mess}$ that may be expected for the comparison of the base system with a correction measurement, for this physical quantity, is calculated from the "position error" with standard deviation $\sigma_{Pos}$ and the "receiver clock error in the unit m" with standard deviation $\sigma_{Clk}$, and from the measurement noise $\sigma_{PSR}$ of the pseudorange measurement. Therefore:

$$\sigma_{PSR,Mess}^2 = \sigma_{Pos}^2 + \sigma_{Clk}^2 + \sigma_{PSR}^2 \tag{1}$$

In some examples, a three-dimensional projection of the position error onto the line of sight to the satellite is not carried out, to avoid a coupling of the vehicle direction with the threshold value of the stochastic model, exceeding of which leads to rejection of the corresponding value. In some examples, in the system initialization phase that frequently takes place at a standstill, such a coupling leads, to false error detection due to the undefined direction.

Therefore, the position uncertainty $\sigma_{Pos}$, thus the variance of the position as a worst-case deviation, is calculated as the sum of the squares of the position uncertainties in the three vehicle-fixed X-, Y- and Z-axes used in the system model of the fusion filter:

$$\sigma_{Pos}^2 = \sigma_E^2 + \sigma_N^2 + \sigma_U^2 \tag{2}$$

The $n \cdot \sigma$-environment, and thus the threshold value $\xi_{IMU,Code} = n \cdot \sigma_{GPSR,Mess}$ of the stochastic model, is given by:

$$\xi_{IMU,Code} = n \cdot \sigma_{GPSR,Mess} \tag{3}$$

The choice of parameter n thus influences the maximum deviation, still accepted as white noise, of the values compared and thus also establishes the confidence level of the test. The parameter n is significant for the functioning of the fusion filter in arriving at the optimum compromise between higher availability of measured data (n greater) and greater error suppression (n less). The resulting comparison assesses a value as implausible where:

$$\Delta\rho > \xi_{IMU,Code}. \tag{4}$$

Where the comparison with the stochastic model has categorized a value as implausible, this is now subjected to a paired comparison with values from other pseudorange measurements of the same measurement epoch. In some examples, It is taken as a basis that a position error observable in $\Delta\rho_n$ has geometrically determined correlations in all other position errors $\Delta\rho_m$, $m \neq n$, non-orthogonal to its position vector. Since an individually observed nonconformity does not clearly identify the erroneous value as such, all available satellites are checked against one another. For example, the distance between two satellites is on the one hand calculated as $l_{Eph}$ from the orbits assumed to be precise, and on the other as $l_{Mess}$ by means of the Cosine law from the difference angle of the position vectors to the satellites a and the pseudorange measurements:

$$l_{Mess}^2 = \rho_m^2 + \rho_n^2 - 2 \cdot \rho_m \cdot \rho_n \cdot \cos(\alpha) \tag{5}$$

Since the coordinates of the satellites and of the vehicle and thus also the vectors between them are known, the term $\rho_m \cdot \rho_n \cdot \cos(\alpha)$ is simplified to the scalar product of the vectors between the receiver antenna and satellites:

$$\rho_m \cdot \rho_n \cdot \cos(\alpha) = (\vec{r}_m \cdot \vec{r}_n) = \rho_m \cdot \rho_n \cdot (\vec{e}_m \cdot \vec{e}_n) \tag{6}$$

where $\vec{e}_m$, $\vec{e}_n$ are standard position vectors of the receiver antenna in the direction of the satellites. Thus, the distance determined by measured data between two satellites is given by:

$$l_{Mess} = \sqrt{\rho_m^2 + \rho_n^2 - 2 \cdot \rho_m \cdot \rho_n \cdot (\vec{e}_m \cdot \vec{e}_n)} \tag{7}$$

In some examples, it is further assumed that the position error of the strapdown algorithm used is insignificantly small in relation to the total length of a pseudorange (on average approximately 22,000 km), and thus similarly the viewing angle error is insignificantly small.

The distance calculated from the orbits between two satellites is given by the amount of the vectorial difference in the satellite positions:

$$l_{Eph} = \|\vec{r}_{m,Eph} - \vec{r}_{n,Eph}\| \tag{8}$$

In some examples, the difference in length $\Delta l$ of the satellite distance from both calculations serves as a first evaluation variable of a stochastic model:

$$\Delta l = |l_{Mess} - l_{Eph}| \quad (9)$$

The Gaussian error propagation of the noise of the pseudorange $\sigma_m^2$ and $\sigma_n^2$ together with the uncertainty of the orbits $\sigma_1$ gives for the standard deviation $\sigma_1$ of $\Delta l$:

$$\sigma_{\Delta l} = \sqrt{\left(\frac{\rho_m - \rho_n \cdot (\vec{e}_m \cdot \vec{e}_n)}{l_{Mess}}\right)^2 \cdot \sigma_m^2 + \left(\frac{\rho_n - \rho_m \cdot (\vec{e}_m \cdot \vec{e}_n)}{l_{Mess}}\right)^2 \cdot \sigma_n^2 + \sigma_{Eph}^2} \quad (10)$$

The errors of the orbits may be assumed to be negligible, so that for $l_{Eph}$ a variance of $\sigma_{Eph}^2 = 0$ results. The threshold value $\xi_{Code,Code}$, which if exceeded leads to rejection of the corresponding value, is calculated as:

$$\xi_{Code,Code} = n \cdot \sigma_{\Delta l} \quad (11)$$

Geometric effects with varying intensities of pseudorange errors on the evaluation variable $\Delta l$ are considered by the threshold calculation and compensated for, resulting in a configuration-independent error sensitivity of the checking. Mathematically critical configurations regarding error sensitivity and singularities:

A critical sensitivity that cannot be compensated for with respect to small errors for a pseudorange measurement of a satellite would exist if, seen from a first satellite, the angle between the position vectors and the receiver antenna and a second satellite were 90° and simultaneously the distance to the other satellite was very much greater than the error of the measured data. Because of the approximately circular orbits of the satellites this configuration is geometrically impossible.

A singularity would exist if $\sigma_m = \sigma_n$ and $\alpha = 0$. This means that two satellites are in the same position which, again, is impossible.

A nonconformity taking into consideration the measurement imprecision is identified where the condition $$\Delta l > \xi_{Code,Code} \quad (12)$$

is met. Thus, the distance determined from the known orbits to the satellite used for comparison is compared with the distance of the satellites determined from the measured data taking into consideration the measurement imprecision. This check is performed for all pairings of satellites, for which measured data is available. In this case, for the measured data or values of each satellite, a quality counter for each individual satellite is increased by a specified set value.

In some examples, the quality counter for a nonconformity for each of the two satellites or values involved in the comparison is increased. If a value has a quality counter, which exceeds a plausibility threshold, then the corresponding value is considered erroneous and not used for the subsequent sensor data fusion or for the correction of the base system.

In the following, by way of example, the plausibility checking of values of an odometry navigation system is described. For this the values are initially compared with a model specific to the sensor adapted to the specific features of the odometry navigation system. The planar speed difference $\Delta \vec{v}_{xy}$ is calculated from the measured data of the odometry navigation system. This is given by the difference between the planar speed determined by the base system, an inertial navigation system, and the planar speed determined by the odometry measurement in the vehicle-fixed x-y-plane at the position of a wheel. The maximum standard deviation $\sigma_{Odo,Mess}$ of the speed that can be tolerated for the comparison with the model is calculated from the "speed error" with standard deviation $\sigma_{Vel,xy}$ and the "yaw rate error" with the standard deviation $\sigma_{v\_\omega,z}$ transformed via the known lever arm between wheel and location of the inertial sensors of the inertial navigation system on the vehicle at the speed at the position of the wheel, and from the measurement noise $\sigma_{Odo}$ of the odometry measurement:

$$\sigma_{Odo,Mess} = \sqrt{\sigma_{Vel,xy}^2 + \sigma_{v\_\omega,z}^2 + \sigma_{Odo}^2} \quad (13)$$

The criteria for selecting the parameter n for the plausibility checking of the values of the odometry navigation system correspond, for example, to those of the plausibility checking of the values of the pseudoranges of the satellite navigation system.

The n·σ-environment, and thus the threshold value $\xi_{IMU,Odo}$, is thus given by:

$$\xi_{IMU,Odo} = n \cdot \sigma_{Odo,Mess} \quad (14)$$

In the comparison with the stochastic model used as a basis, a value is rejected if:

$$\|\Delta \vec{v}_{xy}\| > \xi_{IMU,Odo} \quad (15)$$

Furthermore, a comparison according to the disclosure of values of the odometry navigation system with other values of the odometry navigation system from the same measuring epochs is performed. In some examples, use is made of the physical relationship by which the wheels of a vehicle are rigidly fixed to one another and the speed difference $v_{p,q}$ between a wheel p in the direction of the position vector $\vec{e}_{p,q}$ and another wheel q is determined by:

$$v_{p,q} \leq (\vec{v}_p - \vec{v}_q) \cdot \vec{e}_{p,q} \quad (16)$$

in the context of the measurement uncertainty $\sigma_{v\_mn}$ is equal to zero. This measurement uncertainty is given by:

$$\sigma_{v\_pq} = \sqrt{\sigma_{Odo,p}^2 + \sigma_{Odo,q}^2} \quad (17)$$

In some examples, similar to the checking of the GPS code measurements with each other, the values of each wheel are now compared with the values of all other wheels in pairs, and for each individual wheel where a nonconformity is identified, a set value of the respective wheel or the quality counter associated with the respective value is increased. When the plausibility threshold value is exceeded, the corresponding value is not checked for plausibility and is rejected. In some examples, the case of a position vector positioned orthogonally to the measurement direction of a wheel at another wheel, where a mutual observability of nonconformities is absent, must be taken into consideration here. This occurs, by way of example, statically on an unguided rear axle of a twin track vehicle, but also dynamically when driving straight ahead on the front axle. In order to implement a generally valid method for checking plausibility, the plausibility threshold is adjusted as a function of the measurement direction. The measured data or values $\xi_{Nutz}$ of two wheel speed sensors, which are jointly observable and can thus be used for plausibility checking, correspond to the amount of the projection of their measurement directions $\vec{e}_{Mess,Rad,p}$ and $\vec{e}_{Mess,Rad,q}$ onto the position vector $\vec{e}_{p,q}$:

$$\xi_{Nutz} = |(\vec{e}_{Mess,Rad,p} \cdot \vec{e}_{p,q}) \cdot (\vec{e}_{Mess,Rad,q} \cdot \vec{e}_{p,q})| \quad (18)$$

The unit vector of the measurement direction of a sensor runs in wheel coordinates in the direction of the x-axis, and the transformation in the measurement direction in vehicle coordinates $\vec{e}_{Mess,Rad}$ takes place via the steering angle $\delta_L$, which is assumed to be a pure rotation about the z-axis of the wheel:

$$\vec{e}_{Mess,Rad} = \begin{bmatrix} \cos(\delta_L) \\ \sin(\delta_L) \\ 0 \end{bmatrix} \quad (19)$$

The threshold value $\xi_{Odo,Odo}$ of the stochastic model, used as a basis here for checking, is weighted with an usable component $\xi_{Nutz}$, with a resulting n—σ-environment of:

$$\xi_{Odo,Odo} = \xi_{Nutz} \cdot n \cdot \sigma_{v\_pq} \quad (20)$$

The resulting check against the stochastic model assesses a measurement as invalid, where:

$$v_{p,q} > \xi_{Odo,Odo} \quad (21)$$

Thus in effect the speed of a first wheel is compared with the speed of a second wheel taking into consideration the measurement imprecision.

A number of implementations have been described. Nevertheless, it will be understood that various modifications may be made without departing from the spirit and scope of the disclosure. Accordingly, other implementations are within the scope of the following claims.

What is claimed is:

1. A method for verifying measured data from at least one sensor system of a motor vehicle, the measured data directly or indirectly describe values of physical quantities, the method comprising:
    receiving, from an inertial navigation system, a first measured value at a first time, the first measured value being a speed value, an acceleration value, or a yaw rate of the motor vehicle associated with the motor vehicle;
    receiving, from a satellite navigation system, a second measured value at the first time, the satellite navigation system including a global positioning system (GPS) receiver;
    receiving, from an odometry navigation system, a third measured value at the first time, the odometry navigation system includes a wheel speed sensor on each wheel of the motor vehicle and a steering angle sensor;
    mutually comparing, at a fusion filter in communication with the inertial navigation system, the satellite navigation system, and the odometry navigation system, the first, second, and third measured values in pairs, the first, second, and third measured values describing an identical quantity;
    updating, at the fusion filter, the speed value, the acceleration value, or the yaw rate of the motor vehicle based on comparing the first, second, and third measured values and
    outputting, from an output module in communication with the fusion filter, the updated speed value, the updated acceleration value, or the updated yaw rate of the motor vehicle.

2. The method of claim 1, further comprising:
    for each paired comparison, leading to a nonconformity:
        increasing a quality counter associated with the values involved in the comparison by a specified set value; and
        verifying values where their quality counter does not exceed a quality threshold.

3. The method of claim 1, wherein mutually comparing includes applying a stochastic model specific to the inertial navigation system, the satellite navigation system, and the odometry navigation system respectively, the stochastic model takes into consideration measurement uncertainties specific to the inertial navigation system, the satellite navigation system, and the odometry navigation system respectively.

4. The method of claim 1, wherein a quality counter associated with the inertial navigation system is never increased.

5. The method according of claim 1, wherein the values being compared have been detected at an identical point in time.

6. The method of claim 1, wherein a comparison for nonconformity is identified when the values deviate from one another by more than their measurement uncertainties.

7. The method of claim 1, wherein the verified values are fused into a fusion data set.

8. The method of claim 1, wherein the inertial navigation system is the base sensor system.

9. The method of claim 1, wherein calculating values of indirectly described quantities, orbits of satellites of the satellite navigation system are assumed to be error-free.

10. A system for verifying measured data of at least one sensor system supported by a motor vehicle, the system comprising:
    an inertial navigation system providing a first measured value at a first time, the first measured value being a speed value, an acceleration value, or a yaw rate of the motor vehicle;
    a satellite navigation system providing a second measured value at the first time, the satellite navigation system including a global positioning system (GPS) receiver;
    an odometry navigation system providing a third measured value at the first time, the odometry navigation system includes a wheel speed sensor on each wheel of the motor vehicle and a steering angle sensor;
    a verification module in communication with the inertial navigation system, the satellite navigation system, and the odometry navigation system, the verification module comparing the first, second, and third measured values in pairs, the first, second, and third measured values describing an identical quantity; and
    an output module in communication with the verification module, the output module outputting an updated speed value, an updated acceleration value, or an updated yaw rate of the motor vehicle,
    wherein at least one of the satellite navigation system and the odometry navigation system determines at least two of the at least three values describing an identical quantity independently of one another and the base sensor system determines a third value describing an identical value; and
    wherein the verification module generates the updated speed value, the updated acceleration value, or the updated yaw rate of the motor vehicle based on comparing the at least three values describing the identical quantity in pairs.

* * * * *